Patented Jan. 10, 1928.

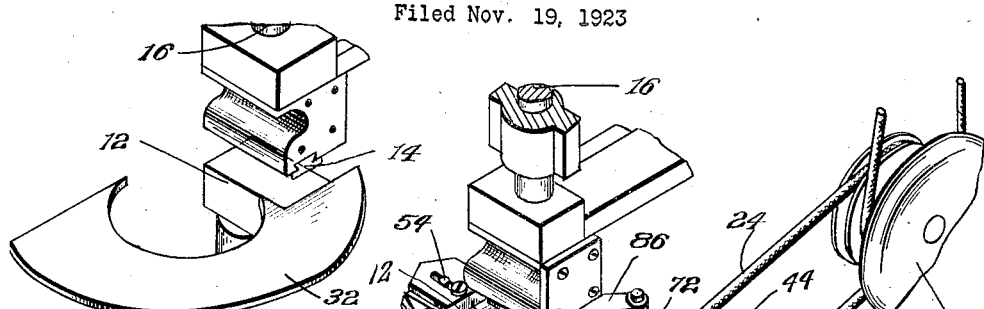

1,655,427

UNITED STATES PATENT OFFICE.

THOMAS LUND, OF BEVERLY, MASSACHUSETTS, ASSIGNOR TO UNITED SHOE MACHINERY CORPORATION, OF PATERSON, NEW JERSEY, A CORPORATION OF NEW JERSEY.

WORK-PRESENTING DEVICE.

Application filed November 19, 1923. Serial No. 675,606.

This invention relates to a work-presenting device and more particularly to a device whereby small pieces of work may conveniently be presented to the operating tool of a machine and accurately positioned with respect to said tool without danger to the operator.

In the presentation of small flexible shoe parts such as heel pads, ankle protecting pieces and the like to a machine such as an embossing machine which employs a reciprocating heated die, it has been found difficult accurately to present the work pieces to the die without danger to the operator either from crushing the fingers or from burns by contact with the heated die. Largely for these reasons the production of such a machine is very considerably decreased when it is applied to the marking of small pieces of work.

An object of the present invention is to provide an improved work-presenting device capable of handling small flexible pieces of work by means of which the work will be accurately presented to the operating tool of such a machine and the operator safeguarded, thereby increasing the production of the machine.

A feature of the invention resides in a work-presenting device interposed between the operating tool and the operator comprising a member rotatable about an axis at the front of the machine between the work table of the machine and the operator and combined with a substantially annular supporting member extending between the operator and the work table of the machine and in the plane thereof so that the rotatable member may carry pieces of work presented to it along said member on to the work table of the machine rapidly and accurately. Preferably, the annular member is interrupted and the rotatable member is arranged to carry the pieces of work away from the operating tool over the interrupted portion of said member where they are delivered from the machine.

Still another feature of the invention consists in an improved construction and arrangement for driving and releasing the transferring member of a work-presenting device of the type referred to. In the particular embodiment shown and illustrated herein the device is frictionally connected to a rotating shaft and is released for turning movement by a latch operated by the reciprocation of the tool of the machine. Preferably the transferring member is held temporarily by the tool itself as the operation is performed upon the work and the return movement of the latch is delayed as the tool is withdrawn. Thus perfect correlation of the movements of the transferring member and the tool is effected and a simple construction is provided which may be operated speedily and safely.

Other features of the invention relate to improved work-holding mechanism provided with novel gages ensuring the accurate presentation of the work to the tool.

It will be obvious to those skilled in the art that the device shown herein and claimed is not limited in its application to the particular machine in connection with which the problem arose. For purposes of illustration, however, the device is herein shown as mounted upon and used in connection with an embossing machine.

In the accompanying drawings:—

Fig. 1 is a perspective view of the work-feeding device and the associated parts of an embossing machine;

Fig. 2 is a plan view;

Fig. 3 is a side elevation;

Fig. 4 is a perspective view of the work-supporting table;

Fig. 5 is a detail view showing the releasing latch;

Fig. 6 is a detail of the connection between the parts of the work-holding device; and Fig. 7 is a view partly in section of the friction drive for the rotating turret.

The machine in which the work-presenting device of the invention is illustrated as incorporated comprises a frame 10 and a work-supporting anvil 12, which co-operates with a heated die 14 carried by a reciprocating plunger 16. This plunger is driven by power received from a driving pulley 18.

The moving parts of the device are preferably mounted on a U-shaped bracket 20 (Fig. 2) mounted on a transverse pin 21 and bolted to the frame of the machine. The bracket 20 is provided at its outer end with bearings for a transverse shaft 22, which is arranged to be driven from the driving pulley of the machine by means of a belt 24. Bearings are also provided in the bracket for a vertical turret-carrying shaft 26, which is arranged to be driven continuously from the shaft 22 by a worm 28 and a gear 30. From an inspection of Fig. 4, it will be seen that a supporting table 32, formed as a segment of an annulus, is rigidly attached to the anvil 12 and has its upper surface in the plane of the upper surface of said anvil. Superposed on this table 32 and frictionally driven from the vertical shaft 26 is a work-presenting device in the form of a turret 40, which is provided with two similar arms 42 and 44. Each of these arms has an opening 46 (see Fig. 5) which is practically surrounded by work gages. These work gages comprise end members 50 held in position by screws 52 and pins 54 passing through slots in the gages and secured to the arms of the turret. The side gages 56 are provided with oblique slots, which co-operate with headed pins 58 upon the end gages. Inward movement of the end gages will therefore cause a corresponding and predetermined inward movement of the side gages, the design of the arrangement being such as to adapt it for the particular class of work for which the device is being built. Because of the adjustments provided, the particular design is adapted for the various sizes of work which will be encountered in practice. It will be seen from Fig. 5 that each of the gage pieces is provided with an overhanging lip which enters one of the openings 46 of the turret arms and brings the effective parts of the gages into position for engagement with the edges of the piece of work. The ends of the side and end gages are halved, as shown in Fig. 6, so that they are located substantially in the same plane.

The turret is operated by a frictional drive which may be best seen from an inspection of Figs. 1 and 7 and comprises a disk 60 pinned to the vertical shaft 26 and provided with a leather or similar facing 62. The central part of the turret 40 rests directly upon this leather facing 62 and is maintained in engagement therewith by means of a similarly faced disk 64 resiliently held in position by means of a spring 66, which is interposed between said disk and the nuts 68 on the end of the shaft 26.

The continuous rotation of the vertical shaft 26 tends therefore to cause continuous rotation of the turret 40. This is prevented, however, by an overthrow-preventing latch 70 (Fig. 5), which is mounted on a plunger 72 slidable vertically in a bearing 74 formed in the bracket 20. The latch 70 is shaped for positive engagement with lugs 76, one of which is formed on the outer end of each of the arms 42 and 44. The plunger 72 is urged upwardly by a spring 78 and is held against rotation by a pin 80 passing through the bearing 74 and entering an elongated slot in the plunger. A friction brake 82 held in contact with the side of the plunger by a spring 84 serves to retard the upward movement of the plunger for a reason which will later appear. Downward movement of the plunger, to release the turret, is preferably effected by a bracket arm 86, which may conveniently be attached to the side of the holder for the die 14 so as to reciprocate with the plunger 16 of the machine.

The design of this arrangement is such that the bracket arm 86 has a lost motion connection with the upper end of the plunger 72 and depresses the plunger sufficiently to remove the latch from contact with one of the lugs 76 just as the die enters the recess in the turret and comes in contact with the work. This position of the die prevents the rotation of the turret until the die has receded. The turret is then free to rotate owing to the fact that the friction device 82 retards the upward movement of the plunger carrying the latch 70 until after the turret has carried the lug 76 out of alinement with said latch. The retardation of the latch is, however, not sufficient to allow more than a half rotation of the turret.

In the operation of the device, the operator will place a piece of work within the opening 46 in the arm of the turret which is at the front of the machine, having previously adjusted the side and end gages to correspond with the size of the work which is being presented. It will be seen that the piece of work rests on the upper surface of the annular table 32 and that when the turret is released for a half revolution, the work will be slipped over the surface of the table 32 into a position directly on top of the anvil 12. The operator will then place another piece of work in that arm of the turret, which is now at the front of the machine, and will depress the operating pedal of the machine (not shown) to cause a reciprocation of the plunger 16 and the embossing of the particular piece of work, which was first presented. As this series of operations is continued, the piece of work which was embossed is slipped off the surface of the anvil and allowed to fall out of the turret into a suitable receptacle placed at the side of the machine. By reason of the fact that work is always placed in the arm of the turret which is removed from the reciprocating plunger carrying the heated die, all danger of injury to the operator is avoided, and she is enabled greatly to increase the speed of operation of the machine both for the reason that no care need be taken to prevent injury and for the reason that the work is bound to be accurately presented to the embossing die without need for holding the work manually in position on the anvil.

Having described the invention, what I claim as new and desire to secure by Letters Patent of the United States is:

1. A work-presenting device comprising a supporting table extending from a remote point to a point beneath an operating tool, a transferring member provided with work-holding means superposed on said table, means for moving the transferring member to bring the work-holding means into and out of position adjacent to an operating tool, and overthrow-preventing retaining means adapted to be released by movement of said tool normally urged to a position to stop positively the transferring member in position to receive the work.

2. A work-presenting device comprising a supporting table extending from a remote point to a point adjacent to an operating tool, a transferring member provided with a work-holding recess superposed on said table, constantly operating means for moving the transferring member to bring the work-holding recess into and out of alinement with an operating tool, and retaining means for stopping positively the transferring member when the work is in alinement with the operating tool.

3. A work-presenting device comprising a supporting table extending from a remote point to a point beneath an operating tool, a transferring member provided with a work-holding recess superposed on said table, constantly operating means for moving the transferring member to bring the work-holding recess into and out of alinement with an operating tool, and retaining means for stopping positively the transferring member when it is in a position to receive the work and when the work is in alinement with the operating tool.

4. A work-presenting device comprising means having a work supporting surface extending from a remote point to an operating point, a rotatable transferring member provided with a work-holding recess superposed on said surface, continually operating friction driving means for rotating the transferring member to bring the work-holding recess into and out of alinement with an operating tool, and retaining means for stopping the transferring member when the work is in alinement with the operating tool.

5. A work-presenting device comprising means having a work supporting surface extending from a remote point to an operating point to support the work at said point, a rotatable member provided with a work-holding recess superposed on said surface, continually operating friction driving means for rotating the rotatable member to bring the work-holding recess into alinement with an operating tool, and retaining means for stopping the rotatable device when it is at a remote point and when the work is in alinement with the tool.

6. A work-presenting device comprising means having a work supporting surface extending from a remote point to an operating point, a rotatable member provided with a work-holding recess superposed on said surface, means for rotating the rotatable member to bring the work-holding recess into alinement with an operating tool, retaining means for stopping the rotatable device in position to receive the work urged into retaining position, and means to retard the movement of said retaining means into retaining position.

7. A work-presenting device for a machine embodying a work support and an operating tool, said device comprising a rotatable member, a plurality of work-retaining devices on said member, means for rotating said member, and rotation-preventing means constructed and arranged to be pushed aside during the forward movement of the tool to allow the rotation of said rotatable member to bring said work-retaining devices successively into alinement with said tool.

8. A work-presenting device for a machine embodying a work support and an operating tool, said device comprising a rotatable member having a work-retaining device, means for rotating said member, retaining means for controlling the rotation of said rotatable member constructed and arranged for movement into and out of engagement with said rotatable member, and means for retarding the movement of said retaining device in one direction.

9. A work-presenting device adapted for use with a machine embodying a work support and an operating tool, said device comprising a supporting table arranged substantially in the plane of the upper surface of said work support, a rotatable member provided with a work-holding opening superposed on said table during a fractional part of its rotation, means urging said rotatable member in a direction to bring the work first into line with the tool of the machine and then away from the table to allow the work to drop out, and means adapted to be operated by movement of said tool for controlling the rotation of said member.

10. A work-presenting device for a machine embodying a work support and an operating tool, said device comprising a rotary work-carrying turret, rotating means frictionally engaging said turret and urging the rotation of the same to bring a piece of work into and out of alinement with the tool of the machine, and a latch arranged for engagement with the turret to stop its rotation when a piece of work comes into alinement with the tool, said latch being constructed and arranged to be moved out of engagement with the turret by the tool as it approaches the work, the rotation of the turret being prevented by the engagement of the work by the tool.

11. A work-presenting tool for a machine embodying a work support and an operative tool, said device comprising a work-supporting plate disposed substantially in the plane of the surface of the work support, a rotatable turret superposed on said plate and provided with work gaging devices symmetrically disposed with respect to the axis of rotation of the turret, said turret being so disposed with respect to the work support that it will carry a piece of work from a position removed from the work support into alinement with the work support, means continually effective for urging the rotation of the turret in one direction, retaining means arranged for engagement with said turret to hold the turret in position with one of its work-engaging devices in alinement with the tool, and means for retarding movement of said retaining means in one direction.

12. In a work-presenting device, a rotatable turret provided with a work-receiving recess, work-gaging members adjustably mounted on all sides of the recess in said turret to surround said recess, and means for retaining said work-gaging members in adjusted position.

13. In a work-presenting device, gage members for determining the position of a piece of work with respect to said device, comprising end members guided for reciprocation toward and away from one another, means for retaining said end members in adjusted position, and side members constructed and arranged for symmetrical movement toward and away from one another by reason of the adjusting movement of the end gages.

14. In a work-presenting device, gage members comprising end pieces adjustably mounted on the device and provided with pins, side members having oblique slots adapted to be superposed on the pins of the end members, and means for retaining the end members in adjusted position.

15. In a work-presenting device, a rotatable member, a retaining latch for controlling the rotation of said member constructed and arranged to move into and out of engagement therewith, means controlled by an operating part of the machine to which the device is attached for moving said retaining latch out of engagement with the rotatable member, and means for retarding the return of the latch into position for engagement with the rotatable member.

16. A work-presenting device for a machine embodying a work support and an operating tool, said device comprising a rotatable member having work-retaining means, means for rotating said member, and retaining means for controlling the rotation of said rotatable member constructed and arranged for movement into and out of engagement with said rotatable member, said operating tool and said retaining means being constructed and arranged so that movement of the operating tool will operate the retaining means.

17. A work-presenting device for a machine embodying a work support and an operating tool, said device comprising a rotary work-transferring turret provided with a work-receiving opening, means for rotating said turret to bring the opening into alinement with the tool, and a latch arranged for engagement with the turret to stop its rotation when the work-receiving opening comes into alinement with the tool, said tool and said latch being constructed and arranged for co-operative engagement to cause the tool to operate the latch when the tool enters the opening, the rotation of the turret being thereby temporarily prevented by the coaction of the tool with the turret.

18. A work-presenting device for a machine embodying a work support and an operating tool, said device comprising a rotatable member having work-retaining means, means frictionally connected with said rotatable member for imparting rotation thereto, a latch for controlling positively rotation of the rotatable member, and means movable with said tool to push aside the latch as the tool is operated.

19. A work-presenting device for a machine embodying a work-supporting table and an operating tool adapted for relative movement to cause the tool to engage a piece of work supported on said table, said work-presenting device comprising a turret rotatable about an axis in front of said table so that it will occupy a position between the machine and the operator, a substantially annular work-supporting member around said turret with an upper face in the plane of the work table and extending therefrom to a position in front of the tool and adjacent to the operator, and a plurality of work-retaining means upon said turret constructed and arranged to move a series of flexible pieces of leather such as shoe parts along the annular member from a receiving position at the front where they are delivered to the turret by the operator to a predetermined operating position over the work table, whereby the pieces of work may be accurately and rapidly positioned beneath the operating tool without danger of injury to the operator.

20. A work-presenting device for attachment to the front of a machine embodying a flat-surfaced work table and an operating tool adapted to be brought into engagement with work supported on said table, said device including an interrupted annular work-supporting member in the plane of the work table and extending therefrom to a receiving position in front of the tool convenient for the placing of pieces of work thereon by the operator, and a rotatable member supported within said interrupted annular supporting member constructed and arranged to move a plurality of small flexible leather shoe parts along the annular member from said receiving position to a position beneath the operating tool and thence to a delivery position where they are not supported by the annular member.

21. A work-presenting device for an embossing machine which comprises a flat work table and a reciprocating die above said table, said device including a curved smooth-surfaced table in the plane of the work table of the machine and extending therefrom to a position in front of and remote from the reciprocating die, a turret rotatable within said curved table and arranged to carry small flexible pieces such as shoe parts along the curved table from a forward receiving position to an operating position beneath the die including a plurality of work-engaging devices, and means for intermittently rotating said turret to carry the pieces of work from the receiving position to the operating position, said rotating means being timed relatively to the means for reciprocating the die to ensure the positioning of a piece of work upon the work table prior to the descent of the die.

In testimony whereof I have signed my name to this specification.

THOMAS LUND.